United States Patent [19]
Cook et al.

[11] Patent Number: 5,426,981
[45] Date of Patent: Jun. 27, 1995

[54] VIBRATING SENSOR

[75] Inventors: Alan J. Cook; Robert A. Pinnock, both of Birmingham, England

[73] Assignee: Lucas Industries public limited company, West Midlands, England

[21] Appl. No.: 853,144

[22] Filed: Mar. 18, 1992

[30] Foreign Application Priority Data

Mar. 19, 1991 [GB] United Kingdom ............... 9105799

[51] Int. Cl.$^6$ ............................................. G01H 9/00
[52] U.S. Cl. ........................................ 73/655; 73/31.04; 73/31.06; 73/704; 73/862.59; 73/DIG. 1
[58] Field of Search ............. 73/DIG. 1, 862.59, 704, 73/579, 655, 31.04, 31.05, 31.06, 702, 705

[56] References Cited

U.S. PATENT DOCUMENTS

| | | | |
|---|---|---|---|
| 4,300,813 | 11/1981 | Gravel | 73/705 |
| 4,419,896 | 12/1983 | Olson, Jr. | 73/DIG. 1 |
| 4,678,905 | 7/1987 | Phillips | 73/705 |
| 4,757,195 | 7/1988 | Katagiri et al. | 73/705 |
| 4,758,087 | 7/1988 | Hicks, Jr. | 356/345 |
| 4,972,076 | 11/1990 | Willson | 73/862.59 |
| 5,195,374 | 3/1993 | Parsons et al. | 73/DIG. 1 |

FOREIGN PATENT DOCUMENTS

| | | |
|---|---|---|
| 0371592A3 | 6/1990 | European Pat. Off. |
| 2192456A | 7/1986 | United Kingdom |
| 2185106A | 7/1987 | United Kingdom |
| 2189601A | 10/1987 | United Kingdom |
| 2198531A | 6/1988 | United Kingdom |
| 2201776A | 9/1988 | United Kingdom |
| 2201778A | 9/1988 | United Kingdom |
| 2213588A | 8/1989 | United Kingdom |
| 2215055A | 9/1989 | United Kingdom |

*Primary Examiner*—Tom Noland
*Assistant Examiner*—Rose M. Finley
*Attorney, Agent, or Firm*—Nixon & Vanderhye

[57] ABSTRACT

A vibrating sensor comprises an elongated element arranged to vibrate at a frequency dependent upon an external stress applied to the sensor, and an optical fiber for coupling light into an end of the element to excite it into vibration. A light-absorbing layer is provided on a longitudinal surface of the element such that the element will change its configuration, e.g. by bending, as the layer absorbs light and heats that side of the element, this alteration in configuration causing a reduction of radiation which is absorbed so that the element restores. The element may define a Fabry-Perot interferometer between its opposite ends.

14 Claims, 2 Drawing Sheets

VIBRATING SENSOR

BACKGROUND OF THE INVENTION

1. Field of the Invention

This invention relates to a vibrating sensor for responding to physical stress, for example due to forces of pressure or acceleration.

2. Discussion of Prior Art

Sensors are known for sensing physical parameters such as pressure or acceleration in which a resonant beam is formed across a cavity in a semiconductor substrate. The beam is excited to cause it to vibrate at a predetermined frequency: the means for providing the excitation may be optical, thermal, electrostatic, electromagnetic, piezoelectric or acoustic. Stresses applied to the beam through causes such as acceleration or pressure cause the beam to change in frequency of vibration. This change in frequency can be measured and from known data the magnitude of the applied stress can be calculated.

Optically-excited vibrating beam sensors are known which utilize a Fabry-Perot interferometer to modulate light which is incident on the beam, and thereby vibrate the beam using thermal effects. The semi-reflective end of an optical fiber is disposed a precise distance from and perpendicular to a semi-reflective side surface of the beam. Light transmitted down the fiber is incident on the beam, thus heating the beam and causing it to bend. The distance between the end of the optical fiber and the semi-reflective surfaces of the beam therefore alters and the light incident on the beam is reduced. As the beam cools and returns to its rest position, the intensity of light incident on the beam once again increases: the beam is therefore alternately heated and cooled and accordingly caused to vibrate at a predetermined frequency.

In the above-described sensor, the distance between the end of the optical fiber and the semi-reflective side surface of the beam is particularly critical in order to define the Fabry-Perot interferometer. However, it is difficult to mount the optical fiber precisely enough relative to the beam. We have now devised a vibrating sensor which overcomes these drawbacks.

SUMMARY OF THE INVENTION

In accordance with this invention there is provided a vibrating sensor comprising an elongated element which is arranged to vibrate, and means for coupling electromagnetic radiation into an end of said elongated element, the elongated element having along a longitudinal surface thereof a layer which absorbs electromagnetic radiation, the elongated element being arranged to alter its configuration as said layer absorbs radiation, which alteration reduces the energy of radiation absorbed by said layer.

The elongated element vibrates in a cycle as follows: in one position or configuration of the elongated element, the electromagnetic radiation is coupled into the absorbing layer, which therefore absorbs the radiation and heats the adjacent region of the elongated element and so causing displacement of the latter. However, the coupling of the radiation is thereby reduced, so that the elongated element cools and restores, whereupon the coupling increases and the elongated element is heated again.

The opposite ends of the elongated element may be formed with semi-reflective surfaces to define a Fabry-Perot interferometer cavity within the element between the two end surfaces. In one configuration of the elongated element, the incident and reflected waves at each end of the element constructively interfere: this constructive interference increases the radiation intensity within the cavity. The radiation is absorbed by the absorbing layer to cause heating of the elongated element: the change in configuration of the element thus produced alters the distance between the interferometer surfaces, and the incident and reflected waves at each end no longer constructively interfere. The cavity is no longer resonant for this wavelength of light. The elongated element therefore cools and restores its configuration, whereupon the cycle repeats.

Alternatively, the elongated element may be arranged so that as it is heated and changes configuration, less of the electromagnetic radiation is coupled into the end of the element, so that therefore it will cool and restore its configuration, whereupon the cycle repeats.

Preferably the absorbing layer is disposed along one longitudinal side of the elongated element, so that the element is heated adjacent this side and caused to bend because its opposite side remains cool.

The electromagnetic radiation may be of any frequency within the electromagnetic spectrum, but preferably comprises radiation within the optical range of frequencies.

In a preferred embodiment the vibrating element comprises a beam which has been micromachined from a wafer of silicon, quartz, silicon dioxide, silicon nitride or other suitable material.

Preferably the selected material is transparent to the frequency of electromagnetic radiation used.

Preferably the electromagnetic radiation is coupled into the beam by an optical fiber which has its end disposed adjacent the end of the beam.

BRIEF DESCRIPTION OF THE DRAWINGS

An embodiment of the invention will now be described by way of example only, and with reference to the accompanying drawings in which.

DETAILED DISCUSSION OF PREFERRED EMBODIMENTS

Figure 1:
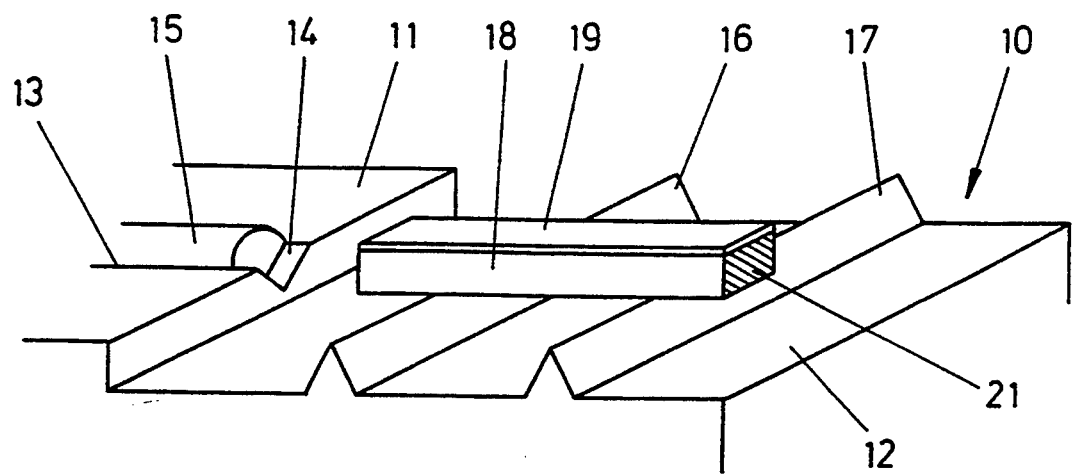
FIG. 1 is a perspective view of a body of semiconductor material formed with an optical vibrating sensor.

Referring to FIG. 1 of the drawings there is shown a semiconductor substrate 10 which has been micromachined to form a vibrating sensor. A portion 11 of the substrate 10 is formed with a V-shaped groove 13 which is provided with an end stop 14. An optical fiber 15 is bonded into the groove 13, and its end abuts the end stop 14.

A portion 12 of the semiconductor substrate is formed with two supports 16, 17 which lie across the width of the substrate. The supports 16, 17 taper towards their upper edges and support an optically transparent beam 18.

The beam 18 lies perpendicular to the supports 16, 17 and these are inset from the opposite ends of the beam. The beam 18 is aligned on the same axis as the groove 13 and its optical fiber 15. The end of the optical fiber 15 is therefore directed at an end face 20 of the beam 18.

The opposite ends 20, 21 of the beam 18 are polished or coated to render them semi-reflective, or the micromachining process may leave them in appropriate polished condition. The upper surface of the beam 18 has a thin layer of optically absorbent material 19 formed on it.

Figure 2:
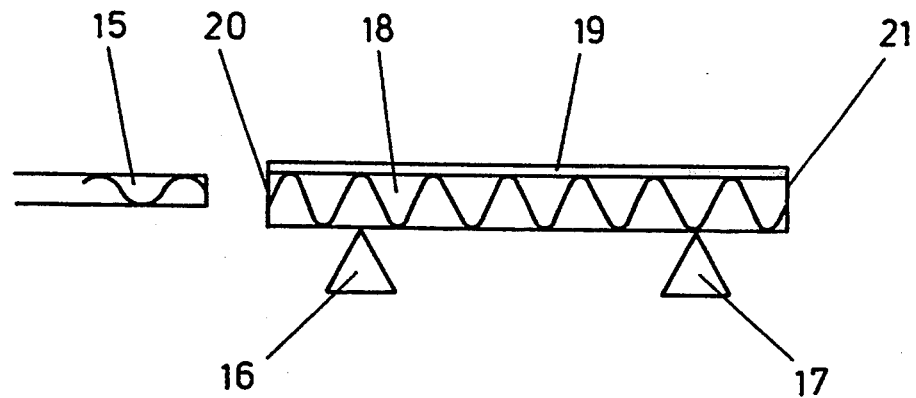
FIG. 2 is a diagrammatic side view of the vibrating sensor of FIG. 1.
Figure 4:
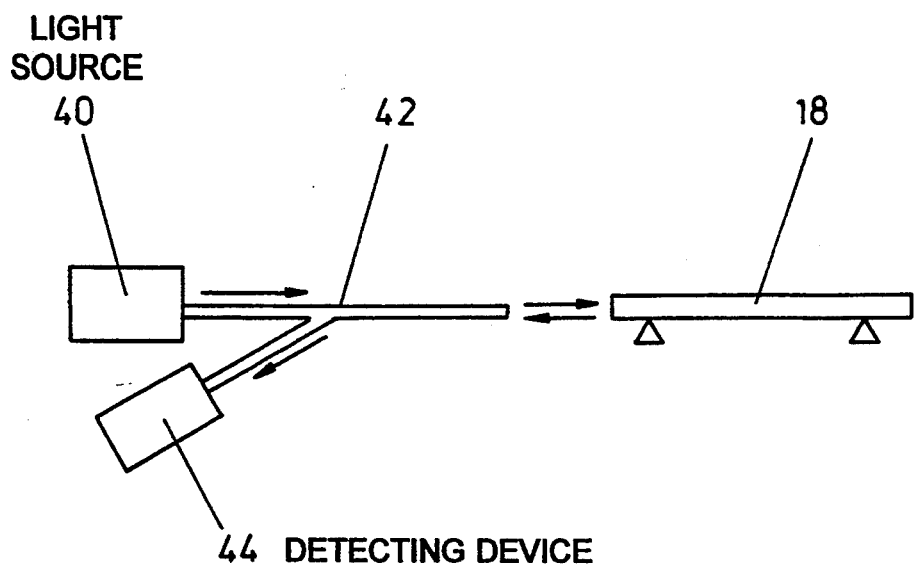
FIG. 4 is a diagram showing light being coupled into an optical vibrating sensor as shown in FIG. 1, in order to excite it, and reflected light being picked up from the sensor, for determining its frequency of vibration.

In use monochromatic or narrow bandwidth light is transmitted down the optical fiber 15 from a light source 40, as shown in FIG. 4. The light emitted from the fiber 15 is coupled into the end of the optically transparent beam 18. The beam 18 forms a Fabry-Perot interferometer cavity between its semi-reflective end faces 20, 21. Any light of the resonant wavelength entering the cavity will be reflected between the two surfaces 20, 21 and the light internally reflected from one such surface will interfere with the light incident on that surface: if the reflected and incident light waves are in phase (as shown in FIG. 2) then they will constructively interfere and produce light of a higher intensity. If they are out of phase then they will partially cancel each other out and reduce the intensity of light passing lengthwise within the beam 18.

The length of the beam 18 is such that, at rest, the incident and reflected waves constructively interfere. The resulting high light intensity is absorbed by the absorbent material 19 formed on the upper surface of the beam. This causes the beam 18 to be heated adjacent its upper surface, causing the beam to expand in length adjacent its upper surface and therefore the beam bends. As the beam bends the distance between the two reflective surfaces 20, 21 increases, so that the incident and reflected light waves become out of phase and the absorbent layer 19 and adjacent region of the beam cool. As this cooling occurs the beam returns to its original position. The process then repeats itself: as a result the beam vibrates at a resonant frequency.

Alternatively, a broadband light source may be used in which case the absorbent layer may comprise a material which better absorbs a particular frequency of light than other frequencies. Preferably the layer preferentially absorbs light of the near infrared frequency. This selective absorption characteristic may be achieved by applying an optical filter layer between the surface of the beam and the absorbing layer.

The absorbing layer may have a characteristic such that its absorption decreases with increasing wavelength. Thus as the beam heats and bends and so increases in length, the standing wave between the opposite ends of the beam is based on progressively longer wavelengths: the energy absorbed therefore decreases progressively as the beam bends, causing it to cool in due course and restore.

Figure 3:
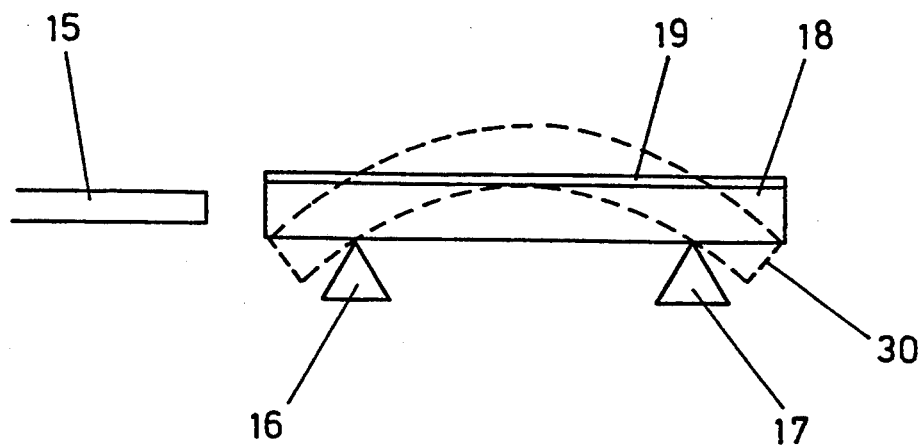
FIG. 3 is a diagrammatic side view of the vibrating sensor of FIG. 1 shown in its relaxed and excited states.

FIG. 3 shows the beam 18 at different positions during its cycle of vibration, but exaggerated for the sake of illustration. The beam bends from its at-rest position (solid line) to an excited position (broken line 30) as it is heated. Then as it cools the beam 18 restores to its rest position.

In an alternative mode of use the beam may be caused to vibrate by modulation of the intensity of light which is coupled into the beam rather than using the effect of the Fabry-Perot interferometer. In this case the Fabry-Perot interferometer effect is inhibited by using a broadband optical source. Referring to FIG. 3 it can be seen that as the beam 18 bends due to light being absorbed by the absorbent layer 19, less light is coupled into the end of the beam 18 from the optical fiber 15. The beam therefore cools and straightens again, whereupon more light is coupled into the beam and the process repeats itself: the effect is that the beam vibrates at a predetermined frequency. This mode of operation is simpler than the above-described mode.

In use of the sensor, the beam 18 is caused to vibrate at a predetermined frequency as described above. Some of the incident light is reflected from the end surface 20 of the beam and returns up the optical fiber 15: the returning light has thus been modulated by the vibrating beam. A fiber optic Y-coupler 42 is used (FIG. 4) to separate the reflected beam and direct it to a detecting device 44. A semi-silvered beam splitting mirror may be used, instead of the Y-coupler 42, to separate the reflected beam. External stresses applied to the beam, such as acceleration or pressure, cause the beam to change its frequency of vibration. This change in frequency is detected by the device 44 and measured from the modulated, reflected light returned through the optical fiber and from known data the magnitude of the applied stress can be calculated.

Figure 5:
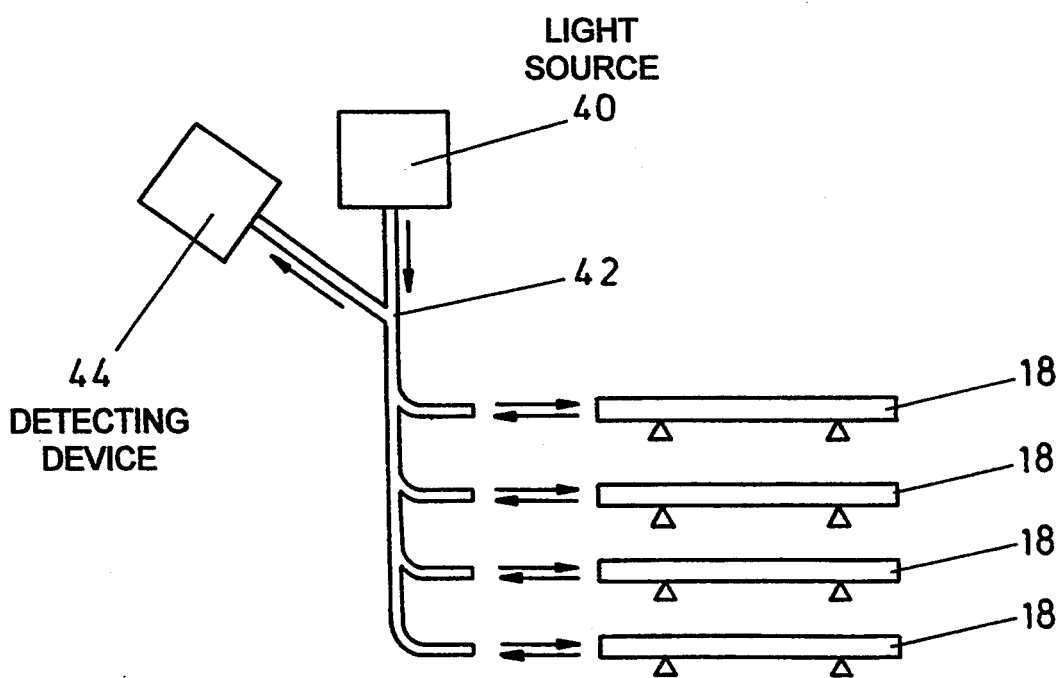
FIG. 5 is a diagram showing an arrangement having a plurality of vibrating elements excited at different wavelengths of light.

As shown in FIG. 5, the beams 18 of a plurality of sensors may be coupled to a common optical fiber 15, the different sensors being excited by different wavelengths of light. Alternatively, the plurality of beams 18 may be formed on a single substrate. The intensity of the beam returned up the optical fiber is monitored by the detecting device 44 at the different wavelengths to determine changes in frequency of vibration of the different sensor beams 18.

The plurality of beams 18 may be arranged to have different natural resonant frequencies of mechanical vibration, but to be excited all by the same wavelength of light. In this case, the light source 40 in FIG. 5 is a single wavelength source: the detecting device 44 includes a plurality of narrow bandpass filters, arranged to pass separate frequency bands centered on the respective natural resonant frequencies of the beams 18.

What is claimed is:

1. A vibrating sensor comprising:
   an elongate element for vibrating, said elongate element having two ends;
   means for coupling electromagnetic radiation into one end of said elongate element, the elongate element including, along a longitudinal surface thereof, a layer which absorbs at least a portion of said electromagnetic radiation, said elongate element having a configuration and, responsive to said layer absorbing at least a portion of said electromagnetic radiation, altering said confirmation; and
   means for reducing the radiation absorbed by said layer as said configuration of the elongate element alters in response to absorption of the radiation by said layer.

2. A vibrating sensor as claimed in claim 1, in which a Fabry-Perot interferometer is defined within said elongate element between said ends of said elongate element when said electromagnetic radiation is coupled into one of said ends of said element in an at-rest configuration, wherein incident and reflected waves of the electromagnetic radiation at each end of the element constructively interfere when the element is in said at-rest configuration.

3. A vibrating sensor as claimed in claim 1, wherein said means for reducing comprises means for altering said configuration of said element from an at-rest configuration towards a configuration in which less of said electromagnetic radiation is coupled into said one end of the element.

4. A vibrating sensor as claimed in claim 1, wherein said absorbing layer is disposed along one longitudinal side of the elongate element, and absorption of electromagnetic radiation by said layer comprises a means for heating the elongate element adjacent said longitudinal side and thereby bending said element.

5. A vibrating sensor as claimed in claim 1, wherein said absorbing layer comprises a means for absorbing electromagnetic radiation of a predetermined frequency as compared to other frequencies.

6. A vibrating sensor as claimed in claim 1, wherein said absorbing layer comprises a means for absorbing less energy with increasing wavelength of radiation.

7. A vibrating sensor as claimed in claim 1, in which the means for coupling electromagnetic radiation into said one end of the elongate element comprises an optical fibre having an end directed at said one end of the elongate element.

8. A vibrating sensor as claimed in claim 1, comprising means for receiving a portion of the electromagnetic radiation which is reflected from said one end of the elongate element, said reflected portion being modulated in accordance with the vibration of said elongate element, said means being responsive to said reflected portion to monitor variations in the frequency of vibration of said elongate element.

9. A vibrating sensor as claimed in claim 1, in which the elongate element comprises a beam which has been micromachined from a wafer of material.

10. A vibrating sensor as claimed claim 1, comprising a plurality of said elongate elements excited by different wavelengths of electromagnetic radiation.

11. A vibrating sensor as claimed in claim 1, comprising a plurality of said elongate elements having different natural resonant frequencies of mechanical vibration, said elongate elements being excited by a common wavelength of electromagnetic radiation.

12. A vibrating sensor, said sensor comprising:
a source of electromagnetic radiation;
an elongate element having two ends and a neutral bending axis extending along a longitudinal axis, said element including a means for selectively absorbing energy from said source of electromagnetic radiation and the amount of energy absorbed dependant upon the position of the elongate element; and
a means for mounting said elongate element, where said means for selectively absorbing comprises a means for asymmetrically heating, with respect to said neutral axis, said elongate element causing said element to move in a direction from an unheated position towards a heated position during an increase in heating and towards said unheated position during a decrease in heating, said means for selectively absorbing absorbs heat at a greater rate in said unheated position than in said heated position, said elongate element and said source of electromagnetic radiation comprising a means for vibrating said element at a frequency which is at least partially dependant upon external stress on the elongate element.

13. A vibrating sensor according to claim 12, wherein said source of electromagnetic radiation is a laser beam, said elongate element comprises a Fabry-Perot interferometer with constructive interference of said laser beam in said unheated position, said means for selectively absorbing comprises an absorber of electromagnetic radiation not located on said neutral axis, and said interferometer, said laser beam and said absorber in combination comprise said means for asymmetrically heating said element with said interferometer providing said absorber a greater intensity of radiation in said unheated position than in said heated position and said absorber generates a greater amount of heat in the unheated position than in the heated position.

14. A vibrating sensor according to claim 12, wherein said source of electromagnetic radiation is positioned to partially illuminate one end of said elongate element in the unheated position thereby coupling at least a portion of said electromagnetic radiation into said element, said means for selectively absorbing comprises an absorber of electromagnetic radiation not located on said neutral axis, and said mounting means, said source of electromagnetic radiation and said element in combination comprising a means for moving said one end of said element and for reducing the electromagnetic radiation coupled into said element when said element moves towards said heated position.

* * * * *